United States Patent [19]

Harkins

[11] Patent Number: 5,045,014
[45] Date of Patent: Sep. 3, 1991

[54] BATTERY OPERATED TOY

[76] Inventor: William F. Harkins, 4834 N. Territory Loop, Tucson, Ariz. 85715

[21] Appl. No.: 612,196

[22] Filed: Nov. 13, 1990

[51] Int. Cl.$^5$ ............................................. A63H 11/00
[52] U.S. Cl. ..................................... 446/236; 446/484
[58] Field of Search ................... 446/3, 236, 237, 238, 446/266, 396, 484, 431, 437, 439, 448, 175; 272/74, 75

[56] References Cited

U.S. PATENT DOCUMENTS

| | | | |
|---|---|---|---|
| 1,425,945 | 8/1922 | Congdon, Jr. ................... | 446/396 X |
| 2,104,636 | 1/1938 | Burcham ............................. | 40/411 |
| 3,888,030 | 6/1975 | Bradt . | |
| 4,082,266 | 4/1978 | Elkins .................................. | 272/75 |
| 4,282,681 | 8/1981 | McCaslin ........................... | 446/484 |
| 4,536,167 | 4/1985 | Hughes .............................. | 446/396 |
| 4,891,032 | 1/1990 | Davis ................................... | 446/484 |
| 4,903,424 | 2/1990 | Satoh et al. ....................... | 446/175 X |

OTHER PUBLICATIONS

"Nancy" Comic Strip, Washington Daily News, Apr. 14, 1990.

Primary Examiner—Mickey Yu
Assistant Examiner—Sam Rimell
Attorney, Agent, or Firm—Cahill, Sutton & Thomas

[57] ABSTRACT

A toy displaying erratic and unpredictable motion for the amusement and fascination of people and pets includes a spherical casing, a battery operated motor having a drive shaft and associated rechargeable battery enclosed within the casing, a flickering element, and means for operably attaching the flickering element to the drive shaft so that the flickering element protrudes from the casing and rotates when the motor is operated. When the flickering element rotates, the casing rotates responsively, thereby causing the toy to move or roll in unpredictable directions, thus providing a source of amusement for people and pets.

9 Claims, 1 Drawing Sheet

U.S. Patent
Sep. 3, 1991
5,045,014
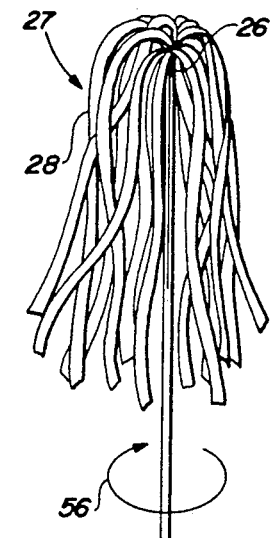
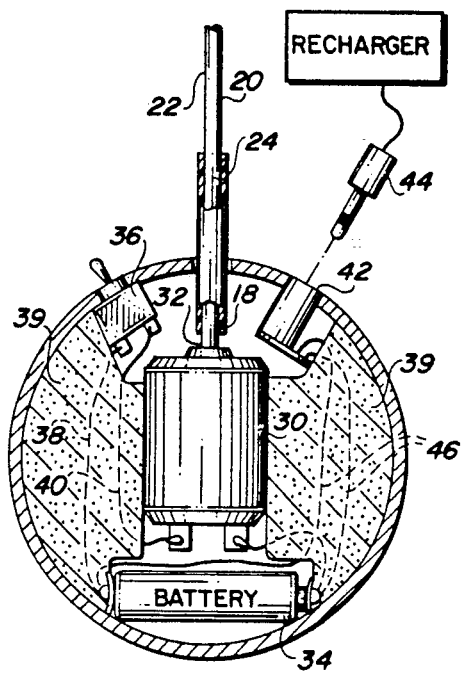
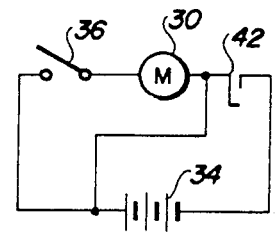
FIG. 2
FIG. 3
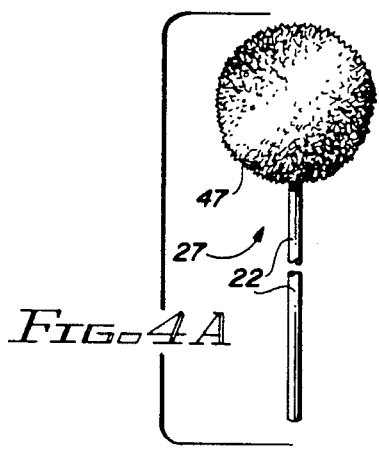
FIG. 4A    FIG. 4B
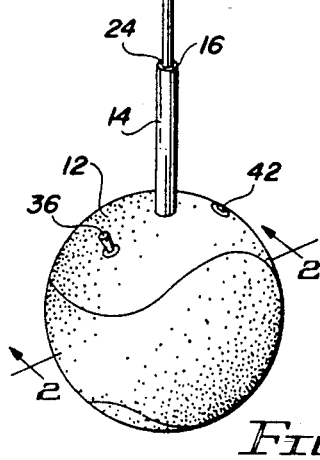
FIG. 1
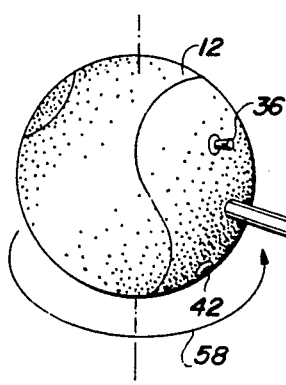
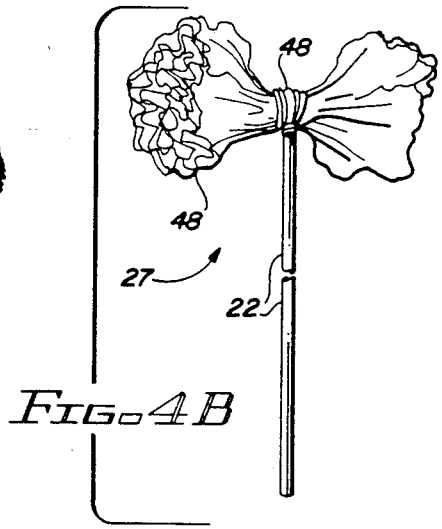
FIG. 4C

BATTERY OPERATED TOY

BACKGROUND OF THE INVENTION

The invention relates to a toy, specifically, to a ball enclosing a battery-operated motor for moving operably attached flickering elements located outside of the ball.

The prior art discloses a number of devices or toys for amusing either pets or people. For example, U.S. Pat. No. 4,927,141 to Parento discloses a novelty ball having a multiplicity of protruding flexible whiskers which cause the moving ball to rapidly decelerate; the ball does not include a battery to move the whiskers. U.S. Pat. No. 4,726,800 to Kobayashi discloses a radio controllable spherical toy. U.S. Pat. No. 3,888,030 to Bradt discloses a kinetic sculpture having rod-like flexible members attached to a tubular device positioned in a stationary base. The base contains a motor which causes the tubular device to rotate, thereby imparting a variety of swinging motions to the attached rod-like members. The Bradt sculpture however does not move. U.S. Pat. No. 3,572,696 to Poynter discloses a novelty golf ball containing a motor; movable legs activated by the motor cause the golf ball to seemingly walk. U.S. Pat. No. 2,939,246 to Glos discloses a ball containing a motor which causes the ball to roll; a gravity-actuated switch controls movement of the ball. Finally, U.S. Pat. No. 2,104,636 to Burcham discloses a rotating spherical device adapted for advertising purposes. However, none of the prior art devices disclose a combination of a motorized ball with movable attachments.

SUMMARY OF THE INVENTION

It is an object of the present invention to provide a toy for the amusement of people and pets.

It is another object of the present invention to provide a toy which moves unpredictably and erratically, thereby providing a means to fascinate people and pets.

It is another object to provide a toy that will not cause injury to either people or pets.

Briefly described, and in an accordance with one embodiment, the invention provides a toy displaying erratic and unpredictable motion for the amusement and fascination of people and pets. The toy includes a spherical casing, a battery operated motor having a drive shaft and associated rechargeable battery contained within the casing, a flickering element, and means for operably attaching the flickering element to the drive shaft so that the flickering element protrudes from the casing and rotates when the motor is operated. When the flickering element rotates, the casing rotates responsively, thereby causing the toy to move or roll in unpredictable directions, thus providing a source of amusement for people and pets.

BRIEF DESCRIPTION OF THE DRAWINGS

FIG. 1 is an elevational view of a first embodiment of the pet toy of the present invention.

FIG. 2 is a closeup cross-sectional view taken on line 2—2 of FIG. 1.

FIG. 3 is a circuit diagram of the circuitry used in the present invention.

FIG. 4A is a elevational view of a second embodiment of the invention.

FIG. 4B is an elevational view of a third embodiment of the invention.

FIG. 4C is an elevational view of a fourth embodiment of the invention.

DETAILED DESCRIPTION OF THE PREFERRED EMBODIMENT

Referring to FIGS. 1, 2 and 3, a toy 10 includes a casing 12 which is preferably spherical; tennis balls and other balls made from either a resilient or a soft material are suitable casing. Inserted in casing 12 is a sleeve or tube 14 having a distal end 16 located outside the casing and an opposing proximal end 18 located inside the casing.

An intermittently moving or flickering element 20 is positioned in distal end 16 of tube 14. In the embodiment illustrated in FIG. 1, flickering element 20 includes a wand 22 having a proximal end 24 positioned in tube 14, and an opposing distal end 26 to which is attached an amusement element 27; in the embodiment shown in FIG. 1, the amusement element is a plurality of streamers 28 preferably made from shiny or brightly colored material to attract the attention of people and pets.

Inside casing 12 is an electrically energized motor 30 such as a Hobby Motor or the like sold by Radio Shack and similar stores; the motor is a means for moving flickering element 20. Motor 30 includes a drive shaft 32 extending therefrom which is adapted to receive proximal end 18 of tube 14.

Electric current is provided to motor 30 by means of battery 34, which is preferably a rechargeable 1.5 volt nickel cadmium battery readily available at Radio Shack and similar stores; alternatively, standard C cell batteries can be used and replaced as necessary. Inserted into casing 12 is a manually operable toggle switch 36 for selectively opening or closing the energizing circuit for motor 30; a switch electrical lead 38 connects the battery to the switch, and a corresponding motor electrical lead 40 connects the switch to the motor. It is preferred to insert stuffing 39, such as cotton or the like, into the casing to keep motor 30, battery 34, and associated wiring in position.

Also mounted in the casing 12 is a receptical 42 to receive jack 44 for connection to a battery recharger such as a Franzus or Battery Eliminator, which can be purchased at Radio Shack or similar stores. Recharger electrical leads 46 connect battery 34 to receptical 42; when the battery loses its charge, the recharger can be set for 1.5 volts and plugged into the receptical, thereby establishing an electrical circuit for recharging the battery. Suitable circuitry for use in the present invention is shown in the circuit diagram of FIG. 3.

FIG. 4A illustrates a second embodiment of the present invention in which amusement element 27 consists of a fluffy pompom 47 into which distal end 26 of wand 22 is inserted.

FIG. 4B illustrates a third embodiment of the present invention in which amusement element 27 consists of an irregular shaped fan 48 made from a stiff material such as cellophane used to wrap cigarette packages; the fan is attached to distal end 26 of wand 22 by means of a rubber band 48 or the like. In the embodiments illustrated in FIGS. 1, 4A and 4B wand 22 is in the range of approximately two to twelve inches long.

FIG. 4C illustrate a fourth embodiment of the present invention in which amusement element 27 consists of a toy rubber tire 50 having a radius in the range of about $\frac{1}{2}$ to $1\frac{1}{2}$ inches. Distal end 26 of wand 22 is attached to tire center 52 by a screw 54; in this embodiment, it is preferred that the length of the wand be no more than about two inches.

To use the pet toy of the present invention, a desired flickering element 20 is selected and inserted into distal end 16 of tube 14, thereby operably connecting the flickering element to drive shaft 32. Toggle switch 26 is turned to the on position, thus establishing an electric circuit to provide electric current to motor 30 from battery 34. The resultant rotational movement of motor 30 is transmitted to drive shaft 32; rotation of the drive shaft causes attached tube 14 to move correspondingly, thereby also rotating flickering element 20. Preferably, the toy is placed on a floor or the like for unimpeded movement; the rotation of flickering element 20 in one direction, indicated for example by arrow 56, causes casing 12 to rotate responsively in another direction, indicated for example by arrow 58. The rotational movements of casing 12 and flickering element 20 cause toy 10 to move or roll erratically and unpredictably across the floor.

In action, the different amusement elements provide different appearances for the fascination and amusement of both people and pets. For example, the movement of pompom 46 attached to wand 22 mimics the movement of a small animal such as a mouse. Alternatively, the sound and movement of cellophane fan 48 mimics that of a large insect such as a June bug. With respect to the embodiment illustrated in FIG. 4C, the rotation of drive shaft 32 causes similar rotation of wand 22 and attached tire 50; when this embodiment is allowed unimpeded movement on a floor or the like, the rotation of the wand and tire in the direction indicated by arrow 56, for example, causes casing 12 to rotate responsively in another direction, indicated for example by arrow 58. Arrow 58 also describes the path by which tire 50 will travel or pivot around casing 12.

While the invention has been described with reference to several particular embodiments thereof, those skilled in the art will be able to make the various modifications to the described embodiments of the invention without departing from the true spirit and scope of the invention. For example, rather than having a spherical casing, the casing can have another, preferably symmetrical, geometry, as long as free movement of the pet toy in operation on the floor is not impeded; obviously, a spherical geometry provides the greatest number of degrees of freedom of movement of the pet toy. Obviously, amusement elements having many different appearances and sounds can be used, or the wand can be used without attaching an amusement element to it.

I claim:

1. A toy comprising in combination:
   (a) a casing;
   (b) an electrically energized motor enclosed within the casing, said motor including a drive shaft;
   (c) a battery enclosed within the casing for supplying electrical energy to the motor;
   (d) an intermittently moving flickering element comprising a wand having a proximal end and an opposing distal end;
   (e) a tube having a distal end located outside the casing, the tube distal end adapted to receive the proximal end of the wand therein, and an opposing proximal end located inside the casing, the tube proximal end adapted to receive the drive shaft therein so that the flickering element protrudes from the casing and rotates when the motor is operated, causing the casing to rotate responsively.

2. The toy of claim 1 wherein the flickering element further includes an amusement element attached to the distal end of the wand, wherein the amusement element is adapted to move in response to movement of the wand, thereby attracting attention.

3. The toy of claim 2 wherein the amusement element is selected from the group consisting of a plurality of streamers, a pompom, a cellophane shape, and a small rubber tire.

4. The toy of claim 2, wherein the amusement element is selected from the group consisting of a plurality of streamers, a pompom, and a cellophane shape, and wherein the wand is in the range of about two to twelve inches long.

5. The toy of claim 2 wherein the amusement element is a rubber tire attached at its center to the distal end of the wand and having a radius in the range of about $\frac{1}{2}$ to $1\frac{1}{2}$ inches, and wherein the wand is no more than two inches long.

6. The toy of claim 1, wherein the battery is rechargeable, and wherein the toy further includes means for recharging the battery and switch means for selectively energizing the motor.

7. The toy of claim 1, wherein the casing has a symmetrical geometry.

8. A toy comprising in combination:
   (a) a ball;
   (b) an electrically energized motor enclosed within the ball, said motor including a drive shaft;
   (c) a rechargeable battery enclosed within the ball for supplying electrical energy to the motor;
   (d) an intermittently moving flickering element comprising;
      (i) a wand having a proximal end and an opposing distal end; and
      (ii) an amusement element attached to the distal end of the wand, wherein the amusement element is selected from the group consisting of a plurality of streamers, a pompom, a cellophane shape, and a small rubber tire; and
   (e) a tube having a distal end located outside the casing, the tube distal end adapted to receive the proximal end of the wand therein, and an opposing proximal end located inside the casing, the tube proximal end adapted to receive the drive shaft therein so that the flickering element protrudes from the casing and rotates in a first direction when the motor is operated, and the casing rotates in an opposite, second direction from that of the flickering element.

9. The toy of claim 8, further including means for recharging the battery and switch means for selectively energizing the motor.

* * * * *